United States Patent [19]

Valstyn et al.

[11] 4,371,905
[45] Feb. 1, 1983

[54] HIGH RESOLUTION HALL EFFECT READ HEAD

[75] Inventors: Erich P. Valstyn, Santa Barbara; G. Vinson Kelley, Santa Monica, both of Calif.

[73] Assignee: Computer & Communications Technology Corporation, Goleta, Calif.

[21] Appl. No.: 206,461

[22] Filed: Nov. 13, 1980

[51] Int. Cl.³ .............................................. G11B 5/38
[52] U.S. Cl. .................................................. 360/112
[58] Field of Search ................. 360/112, 113; 324/252

[56] References Cited

U.S. PATENT DOCUMENTS

| | | | |
|---|---|---|---|
| 2,866,013 | 12/1958 | Reis | 360/112 |
| 3,114,009 | 12/1963 | Camras et al. | |
| 3,221,273 | 11/1965 | Livingston | 332/51 |
| 3,622,898 | 11/1971 | Salmon | 330/6 |
| 3,668,670 | 6/1972 | Andersen | 360/112 |
| 3,943,570 | 3/1976 | Yamamoto et al. | 360/112 |
| 4,040,113 | 8/1977 | Gorter | 360/113 |
| 4,068,272 | 1/1978 | Kanai et al. | 360/113 |
| 4,296,447 | 10/1981 | Lewis | 360/113 |

FOREIGN PATENT DOCUMENTS 1801338 5/1969 Fed. Rep. of Germany.

OTHER PUBLICATIONS

IBM Tech. Disc. Bull., D. A. Nepela et al., Resistive Element for Bias and Noise Cancellation of MR Head, vol. 17, No. 9, Feb. 1975, p. 2759-2760.
IBM Tech. Disc. Bull., R. L. O'Day, Balanced Magnetic Head, vol. 15, No. 9, Feb. 1973, p. 2680.

*Primary Examiner*—Alfred H. Eddleman
*Attorney, Agent, or Firm*—Spensley, Horn, Jubas & Lubitz

[57] ABSTRACT

A differential Hall effect magnetic read head exhibiting improved resolution. The head includes dual Hall elements in which the elements are oriented so that their major surface is perpendicular to the surface of the recording medium and biased so that they respond to the component of magnetic flux which is parallel to the surface of the recording medium. Operation in this manner enables information recorded at extremely high densities to be easily read. In an alternative embodiment, a single Hall element is utilized and direct and delayed outputs are differentially compared in order to detect flux transitions.

8 Claims, 15 Drawing Figures

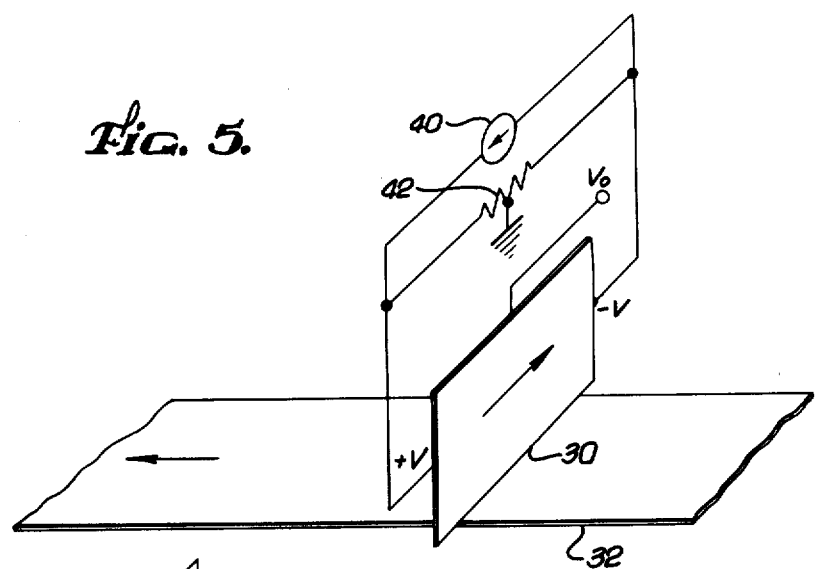
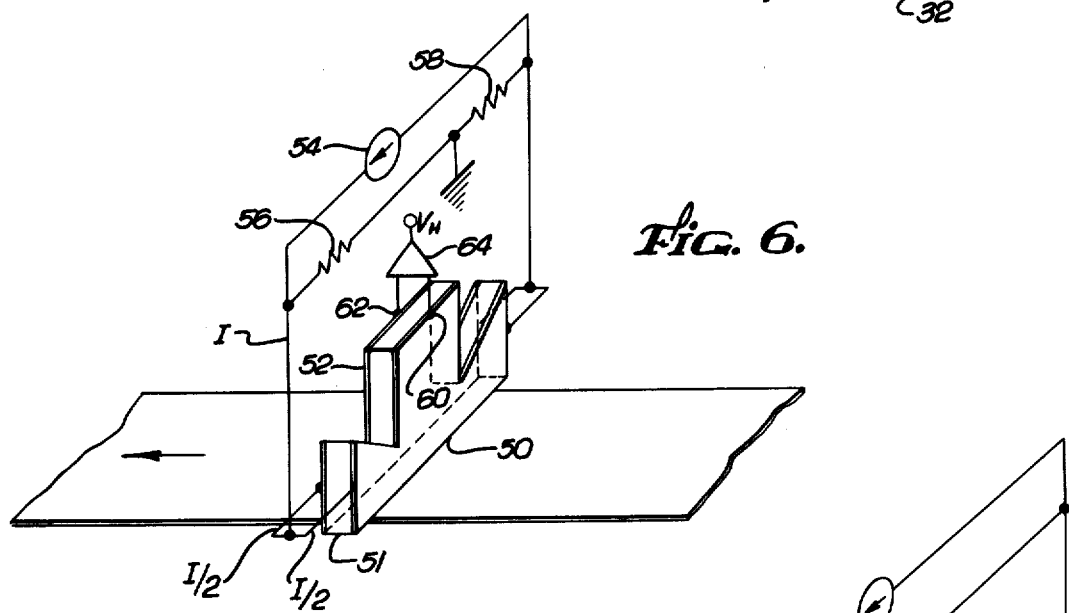
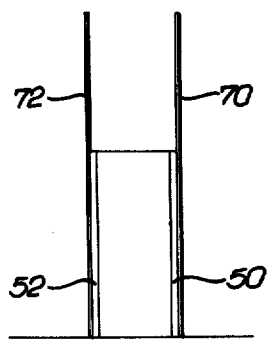
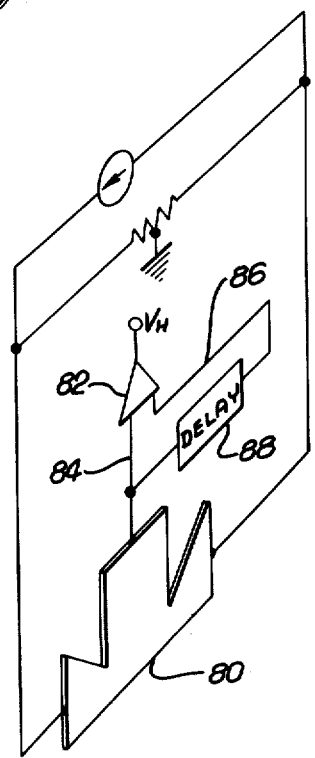

DISTANCE OF HEAD FROM CENTER OF FLUX TRANSITION

HIGH RESOLUTION HALL EFFECT READ HEAD

BACKGROUND OF THE INVENTION

1. Field of the Invention

This invention relates to magnetic read heads which utilize Hall effect elements to detect changes in the magnetic field of a magnetic recording medium.

A Hall device is one which develops an electrical voltage along a first axis upon being biased with electric current along a second axis when a magnetic field is passed through a third axis; the first, second and third axes being at right angles to each other. The output signal is the electric voltage along the first axis and is proportional to the magnetic field.

2. Description of the Prior Art

Materials exhibiting the Hall effect have been utilized in magnetic read heads for many years. Generally, thin film semiconductor materials such as InSb or InAs have been used. One typical head design, shown in FIG. 1, utilizes a conventional ring-type recording head 10 having a Hall element 12 located in the magnetic circuit of the head, often in the rear gap of the head. Movement of a recording medium 14 past the head induces a flux in the magnetic circuit which then passes through the Hall element 12, thereby creating a voltage output. It is the induced flux in the core which is sensed by the Hall element, rather than the actual flux of the recording medium. Heads of this type are disclosed in U.S. Pat. Nos. 3,114,009 to Camras et al. and 3,943,570 to Yamamoto et al. A Hall modulator incorporating a similar construction is disclosed in U.S. Pat. No. 3,221,273 to Livingston. However, the fabrication of a head which incorporates a magnetic core as well as a Hall element is cumbersome and such a device does not lend itself to miniaturization. This concept is therefore unsuitable for high-track-density, multitrack heads, such as are required for digital audio and video tape recorders. Magnetoresistive read elements can be used for this latter application. However, because their dimensions are comparable to the size of the magnetic domains, they are prone to noise and instabilities caused by the Barkhausen effect (sudden rearranging of the domains); moreover, their resolution is inferior to that of the Hall heads which are the subject of this invention.

In order to overcome the problems associated with utilizing magnetic core materials in Hall effect read heads, heads have been developed in which the Hall element is subjected to the magnetic field of the recorded medium itself and no magnetic core elements are utilized. Devices of this type are disclosed in U.S. Pat. Nos. 3,668,670 to Andersen and 3,622,898 to Salmon. In the heads disclosed therein, the thin film Hall element is located so that its major plane is parallel to the surface of the recording medium. The head operates by detecting the portion of the magnetic field of the medium which is perpendicular to the surface of the medium. As shown in FIG. 2, current is made to flow through the Hall element 16 in a direction shown by an arrow 18 such that a magnetic field passing up from the recording medium 20 perpendicular to the plane of the Hall element 16 will produce an output voltage Vo. The position of the Hall element 16 when sensing a flux transition between two regions of mutually opposed magnetization 20a and 20b is shown in FIG. 3. The Hall element 16 senses the component of the magnetic field perpendicular to the surface of the recording medium 20, and the physical orientation of the Hall element is such that the resolution of the head (ability to read very densely recorded information) is limited.

Hall effect read heads have also been proposed which incorporate dual Hall elements. Such a head is shown in German Pat. No. 1,801,338 to Bonny. Two Hall elements are connected in a differential fashion so that the output voltage of the head is a function of the difference between the magnetic fields sensed separately by the two units. By incorporating such a differential connection, the effect of stray magnetic fields on the read head is minimized. As is the case with single unit prior art Hall effect read heads, the Hall elements are oriented so that they detect the component of the magnetic field which is perpendicular to the surface of the recording medium. Because of this configuration, heads of this type have limited usefulness in reading high density digitally recorded information.

SUMMARY OF THE INVENTION

It is a primary object of the present invention to provide a Hall effect read head which has the ability to read very densely recorded information, particularly digitally recorded information. It is another object of the present invention to provide a Hall effect read head which is extremely simple to construct and operate.

These and other objects of the invention are achieved by providing a differential Hall effect read head in which the component of the magnetic flux of the recorded medium parallel to the surface of the medium (rather than perpendicular as in prior art devices) is sensed. This is accomplished by forming a thin film Hall element so that its major plane is perpendicular to the surface of the recording medium and biasing the element so that a magnetic field parallel to the surface of the medium will cause an output signal to be generated by the head.

The head of the present invention operates in a differential fashion, utilizing either one or two thin film Hall effect elements. When two elements are utilized, their outputs are fed directly into a differential amplifier in order to provide an output signal which is a function of the difference in the magnetic fields sensed by the two elements. When a single element is utilized, direct and delayed outputs of the Hall element are connected to a differential amplifier. The effective operation of the single element head with delay circuitry is identical to that of the dual element head, provided the product of medium velocity and delay time is equal to the spacing between the two elements of the dual element head.

BRIEF DESCRIPTION OF THE DRAWINGS

In the drawings:

FIG. 5 is a diagramatic perspective view showing a modified Hall element configuration;

FIG. 6 is a diagramatic perspective view of a dual element Hall effect read head of the present invention;

FIG. 9 is a front sectional view showing the location of magnetic shielding which may be incorporated in the present invention; and FIG. 10 is a diagramatic perspective view of a differential read head incorporating a single Hall element.

DESCRIPTION OF THE PREFERRED EMBODIMENT

Figure 1:
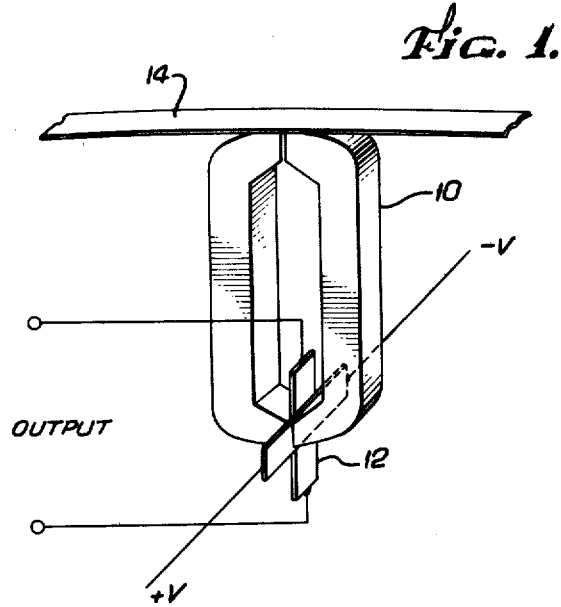
FIG. 1 is a perspective view of a prior art head arrangement utilizing magnetic core materials.
Figure 3:
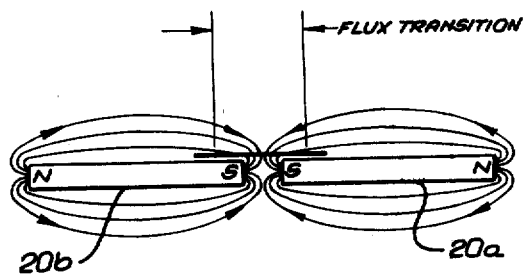
FIG. 3 is a diagramatic sectional view showing the Hall element of the head of FIG. 2 as it moves through a flux transition between two regions of mutually opposed magnetization.
Figure 2:
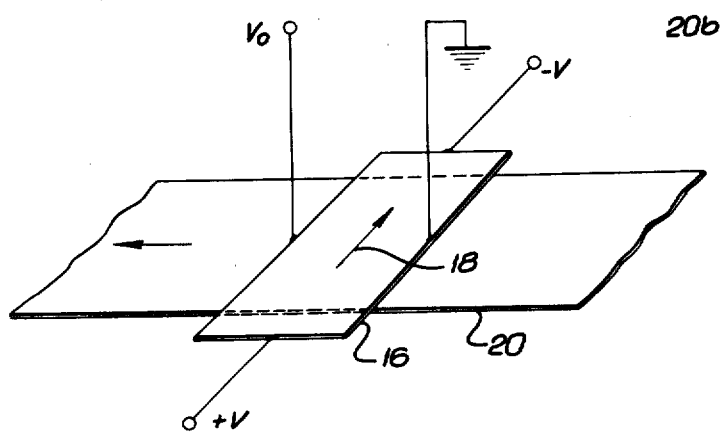
FIG. 2 is a perspective view showing Hall element orientation and operation for one type of prior art head design.
Figure 4:
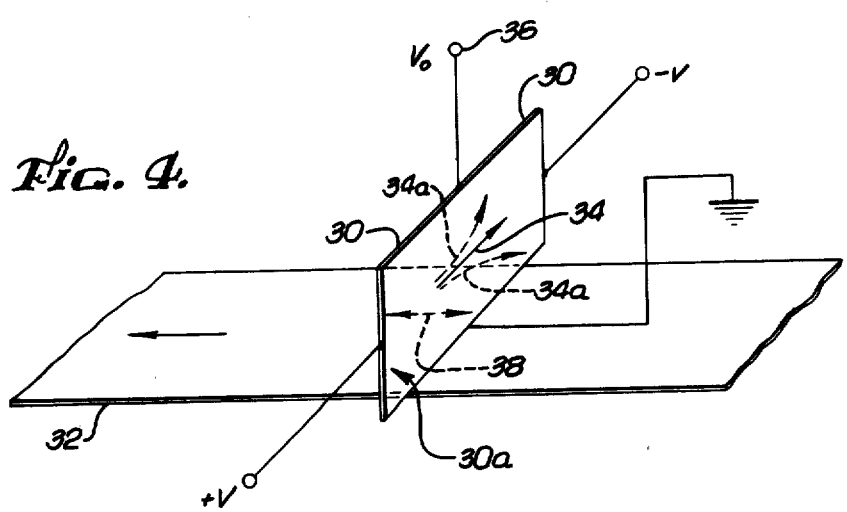
FIG. 4 is a diagramatic perspective view showing the Hall element configuration of the present invention.

FIG. 4 is a diagramatic view of the Hall element orientation used in the present invention. A Hall element 30 is oriented so that its major surface 30a is perpendicular to the surface of the recorded medium 32. Bias current provided by a current source (not shown) is caused to flow through the Hall element 30 in a direction indicated by an arrow 34, and an output signal is developed at terminal 36. A ground connection is made from the lower surface of the Hall element 30. The configuration of FIG. 4 is such that an output will be generated (i.e., the current 34 will be diverted as shown by arrows 34a) when a magnetic field passes through the Hall element 30 in a direction parallel to the surface of the recording medium 32, as indicated by arrow 38. By sensing the component of the magnetic field parallel to the recording medium 32, greater resolution can be achieved as compared to prior art designs, as will be described subsequently.

The configuration shown in FIG. 4 has the disadvantage that the ground connection at the bottom of the Hall element 30 requires that the distance between the Hall element and recording medium be significantly increased, with a resultant decrease in resolution. This problem may be overcome by using the arrangement shown in FIG. 5. Bias current is provided by a current source 40, and the ground connection is made from a resistor 42 connected across the terminals of the current source 40. Such a connection will reduce the amplitude of the output signal $V_o$ by approximately one-half as compared to the standard arrangement; however, the lack of any need for an electrical connection on the bottom of the Hall element enables an extremely close spacing to be maintained between the read head and recording medium. This decrease in spacing results in a significant increase in the resolution of the read head.

A differential read head utilizing the Hall element configuration and output connection of FIG. 5 is shown in FIG. 6. The head includes a pair of Hall elements 50 and 52 which are separated by a non-magnetic spacer 51. A current source 54 provides an equal bias current to each of the Hall elements 50 and 52, and a reference (ground) connection is made between a pair of resistors 56 and 58 connected across the current source 54. Output terminals 60 and 62 of the Hall elements 50 and 52 are connected to the inputs of a differential amplifier 64. The output $V_h$ of the amplifier 64 is proportional to the difference between the output of the Hall elements 50 and 52.

Figure 7:
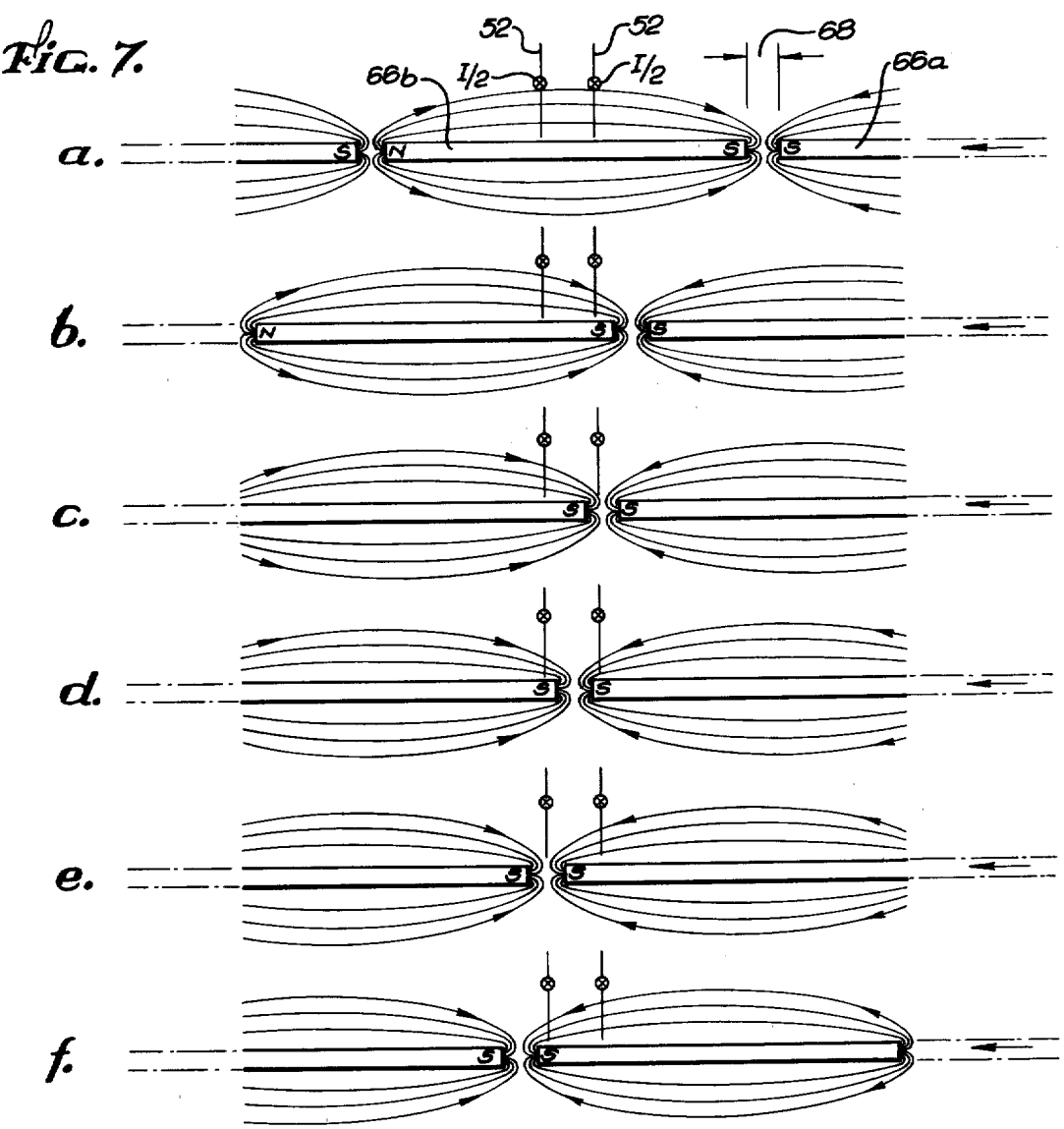
FIGS. 7a-f are diagramatic front sectional views showing the position of the Hall elements of the head of FIG. 6 with respect to a flux transition in the recording medium.
Figure 8:
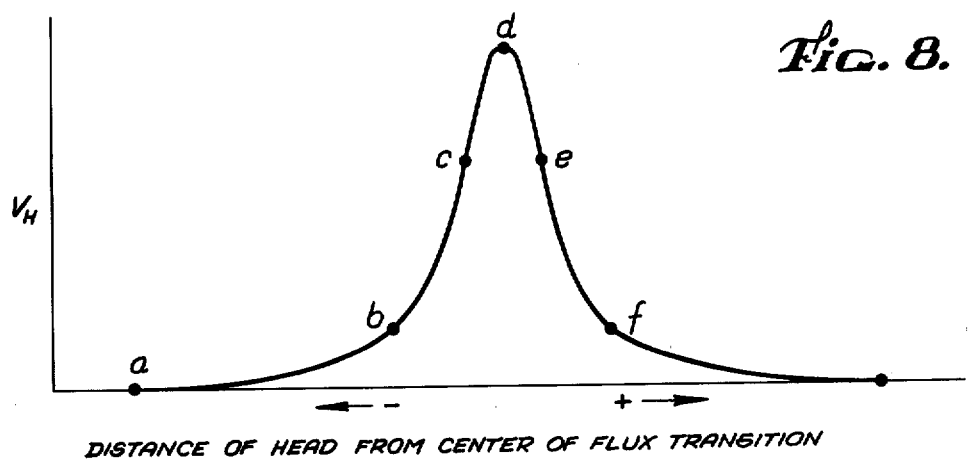
FIG. 8 is a graph of the output of the head of FIG. 6 corresponding to the positions shown in FIG. 7.

The operation of the head of FIG. 6 is best understood by reference to FIGS. 7 and 8. As shown in FIG. 7, each of the Hall elements 50 and 52 have bias currents I/2 applied to them. The recording medium includes adjacent magnetic elements 66a and 66b whose polarities are opposite from one another, thereby resulting in a flux transition in an area 68. When the head is in a position relative to the flux transition shown in FIG. 7a, both of the Hall elements 50 and 52 will sense virtually the same field and the differential outut $V_h$ is therefore near zero, as shown by point "a" on the graph of FIG. 8. When the relative position of the head and flux transition 68 correspond to FIG. 7b, the Hall element 52 will have a very low output and the Hall element 50 will generate a negative voltage (for the current directions as shown), thereby causing the differential amplifier 64 to generate an output. When in a position corresponding to FIG. 7c, the Hall element 50 will generate a positive voltage and the Hall element 52 a negative voltage. The difference between these two voltages will be maximized when the flux transition 68 is directly between the Hall elements 50 and 52 (FIG. 7d). As the recording medium moves past the head, the flux transition 68 will move farther away from the head and the differential output $V_h$ will therefore decrease back to zero.

The resolution (i.e., the ability to independently sense closely spaced flux transitions) of the head of FIG. 6 is dependent upon the spacing between the Hall elements 50 and 52 and upon their right above the recording medium. The vertical orientation of the Hall elements enables the centers of the Hall elements to be spaced very closely together as compared to the standard horizontal orientation. By orienting the Hall elements so that their major surfaces are perpendicular to the surface of the recording medium and sensing the component of the magnetic field parallel to the surface of the recording medium, a head may be constructed which has significantly greater resolution than prior art designs. In addition, by providing electrical connections for the head such that no connections are made on the surface of the head adjacent the recording medium the spacing between the head and medium can be minimized, thereby further increasing resolution.

In order to increase the output signal of the head, a pair of magnetic shields 70 and 72 (FIG. 9) may be provided adjacent the Hall elements 50 and 52, respectively. The shields 70 and 72 may be fabricated of nickel-iron or other similar material and serve to increase the amount of flux passing through the Hall elements, which increases the output signal of the head. The inclusion of the shields 70 and 72 results in somewhat decreased resolution as compared to a non-shielded head.

Referring now to FIG. 10, a head which operates in essentially the same manner as that shown in FIG. 6 but which utilizes a single Hall element is shown. The head includes a Hall element 80, the output of which is connected to a differential amplifier 82 through a direct line 84 and a line 86 which incorporates suitable delay circuitry 88 (well known in the art). Differential sensing of the direct and delayed outputs of the single Hall element 80 is identical to sensing the two outputs of two closely spaced Hall elements. The provision of a ten nanosecond delay by the circuit 88 corresponds to a spacing of 20 micro inches at a recording medium velocity of 2000 inches per second. Delays of this order are very easily achievable with present circuitry.

The heads of the present invention can utilize one of many different semi-conductor thin films for the Hall elements. Indium antimonide (InSb) and Indium arsenide (InAs) are preferred because of their high Hall coefficient and high mobility. However, many other films which exhibit the Hall effect could be employed, including, for example, InBi, AlSb, GaAs, Ge, and GaSb. The films may be formed by any one of several processes known in the art.

In summary, the present invention provides a differential Hall-effect head which has extremely simple construction and provides significantly increased resolution over prior art designs. This increased resolution enables higher density recordings to be accurately read. Higher resolution is obtained by orienting the Hall elements so that their major surface is perpendicular to the plane of the recording medium, biasing the Hall elements so that they respond to the component of the magnetic field which is parallel to the surface of the recording medium and differentially sensing the outputs of the Hall elements. Differential sensing also renders the device insensitive to temperature fluctuations. Differential operation may be achieved by the use of dual Hall elements or by employing a single Hall element and suitable delay circuitry feeding the direct and delayed outputs of the head to a differential amplifier.

Although particular embodiments of the present invention have been described herein, variations and modifications within the scope of the invention will readily occur to those skilled in the art. Therefore, it is intended that the scope of the invention determined by reference to the appended claims rather than the foregoing description.

We claim:

1. A high resolution differential Hall effect head for reading information recorded on a magnetic recording medium, said head including no magnetic core elements and comprising at least one thin film Hall effect element which is oriented so that the film surface is perpendicular to and the film edge is parallel to the surface of the recording medium, means for biasing the Hall effect element so that it senses the component of the magnetic field of the recording medium which is parallel to the surface of the medium, said head including differential means for providing an output signal proportional to the difference between the magnetic field strength of the medium sensed at two points which are spaced a predetermined distance apart in the direction of travel of the medium.

2. For use in a system in which a magnetic recording medium is passed across a read head in order to read magnetic information recorded on the medium, a high resolution differential read head which does not incorporate any magnetic core materials, comprising:

a least one thin film Hall effect element whose surface is perpendicular to the surface of the recording medium and perpendicular to the direction of travel of the medium, said Hall element including a lower edge adjacent the recording medium and an upper edge opposite the lower edge;

bias means for providing a bias current which passes through the Hall element parallel to said upper and lower edges and perpendicular to the direction of travel of the recording medium;

an output terminal near the upper edge of each Hall element, wherein the Hall element will provide a signal proportional to the component of the magnetic field of the recording medium which is parallel to the surface of the medium; and differential means, connected to each output terminal, for generating an output signal proportional to the difference in magnetic field strength of the recording medium at two points along the medium which are spaced a predetermined distance apart in the direction of travel of the medium.

3. The read head of claim 1 or 2 including two Hall effect elements which are parallel to one another and spaced apart by said predetermined distance, wherein the differential means comprises a differential amplifier which receives the outputs of the two Hall elements and generates said output signal.

4. The read head of claim 1 or 2 wherein there is one Hall element and the differential means includes delay circuitry connected to the output of the Hall element and a differential amplifier which receives a direct output from the Hall element and a delayed output from the delay circuitry.

5. A differential read head for reading information recorded on a magnetic recording medium, comprising:

a non-magnetic spacer;

a first thin film Hall effect element located on one side of the spacer;

a second thin film Hall effect element located on a second side of the spacer, wherein said Hall elements are parallel to each other and the surface of each of the Hall elements is perpendicular to the surface of the recording medium, each of said Hall elements including a lower edge which is adjacent the surface of the recording medium and an upper edge opposite the lower edge, the side edges of the Hall element including bias current terminals;

a current source connected to the bias current terminals to supply bias current to the Hall elements so that the Hall elements sense the component of the magnetic field of the recording medium which is parallel to the surface of the recording medium;

a ground connection connected between the bias terminals, wherein the output of each of the Hall elements is taken near the upper edge thereof; and a differential amplifier for providing an output signal proportional to the difference in outputs of the first and second Hall elements.

6. The read head of claim 5 further including first and second magnetic shields located on the surface of the first and second Hall elements, respectively.

7. The read head of claims 1, 2 or 5 wherein the thin film Hall effect element is selected from the group consisting of InSb and InAs.

8. The read head of claims 1 or 2 including a ground connection coupled to the bias means to provide a reference for the output of each Hall element which does not require a contact terminal between the Hall element and the recording medium, thereby enabling the head to be operated in close proximity to the recording medium.

* * * * *